United States Patent Office 3,061,606
Patented Oct. 30, 1962

3,061,606
DELTA-4-PREGNENOLONES AND METHOD
Marcel Gut and Ralph I. Dorfman, Shrewsbury, Mass., assignors to Worcester Foundation for Experimental Biology, Shrewsbury, Mass., a non-profit foundation of Massachusetts
No Drawing. Filed Mar. 14, 1958, Ser. No. 721,371
20 Claims. (Cl. 260—239.55)

This invention is concerned with C–21 steroids having an allylic alcohol or allylic ester grouping in ring A.

More particularly, this invention relates to delta-4-pregnen-3-ol-20-one, delta-4-pregnen-3-acyloxy-20-one, and their 20-ketal blocking derivatives. These compounds have high progestational activity, usually over a period of time substantially prolonged relative to progesterone.

The invention further relates to a method of preparing these compounds, including a novel hydrolysis of a 20-ketal intermediate applicable to any ketalized steroid, particularly delta-4-20-ketal steroids.

The compounds of this invention have the following formula:

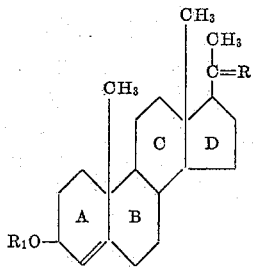

wherein R is ketonic oxygen or a lower alkylene ketal such as ethylene or propylene ketal. $R_1$ is hydrogen, or a hydrocarbon acyl group having from 1 to 10 carbon atoms derived from a carboxylic acid. The 20-lower alkylene ketals of this formula usefully serve as intermediates in the preparation of compounds of this series and also have useful progestational activity.

Where $R_1$ is a hydrocarbon acyl group containing from 1 to 10 carbon atoms derived from a carboxylic acid, it may include radicals illustrated by the following: formyl, acetyl, acrylyl, propionyl, butyryl, dimethyl acetyl, valeryl, caproyl, heptanoyl, octanoyl, cyclo pentanoyl, cyclohexyl formyl, benzoyl, phenyl acetyl, cyclopentyl, propionyl, toluoyl, 3,4-dimethyl benzoyl, naphthoyl, and the like.

The compounds may be prepared by a process which in broadest aspect involves reduction of a delta-4-pregnen-3,20-dione-20-lower alkylene ketal, such as ethylene or propylene ketal, with an aluminum or boron hydride of an alkali metal followed by hydrolysis of the ketal with dilute ethanolic oxalic acid solution to form the delta-4-pregnen-3-ol-one-20. Where the 3-ester is to be prepared, the reduced delta-4-pregnen-3-ol-20-ketal is first esterified to form the 3-acyloxy derivative and the ketal may then be hydrolyzed to the 20-keto compound; or the esters may also be prepared from the free delta-4-3-hydroxy-20-ketone compound.

More specifically the process may be started with a known delta-5-pregnenolone such as delta-5-pregnen-3-acetoxy-20-one which is converted to the 20-alkylene ketal with ethylene glycol, propylene glycol or the like, and an acid catalyst such as p-toluene-sulfonic acid in an inert solvent. The resulting delta-5-pregnen-3-acetoxy-20-ketal is hydrolyzed to form the delta-5-pregnen-3-ol-20-one-20-ketal which is then oxidized in an Oppenauer oxidation with aluminum tertiary butoxide which both converts the 3-hydroxy group to keto and causes delta-5 unsaturation to rearrange to delta-4, thus producing progesterone-20-ethylene ketal (delta-4-pregnen-3-one-20-ethylene ketal) or similar lower alkylene ketal. The progesterone-20-ketal is then reduced with a typical reducing agent such as a hydride of which lithium aluminum hydride, potassium borohydride or sodium borohydride are examples.

The delta-4-pregnen-3-ol-20-one-20-ketal intermediate or its 3-acyloxy esters, upon hydrolysis with ethanolic oxalic acid, will not remove the 3-hydroxy or acyloxy group. Moreover, even for steroids other than those included in the formula above, this hydrolysis procedure will not remove other hydroxyl groups. For instance, in cortisone type compounds that may have hydroxy or ester groups at C–11, C–17 or C–4 positions, this hydrolysis will not affect these position substituents. In this respect the particular ketal hydrolysis of this invention is novel and unique and has general application for protecting the 20-keto steroid position, allowing simple hydrolysis of the 20-ketal derivative without introduction of undesirable unsaturation in the steroid molecule.

The compounds of the above formula are generally active and by the above procedure mixtures of both alpha and beta are formed in the reduction of the 3-keto compound. That mixture may be used as such since it has substantial progestational activity, containing the alpha and beta isomer in a ratio of approximately 1:10, or the beta isomer can be obtained by successive recrystallizations or with digitonin precipitation.

Compounds of the 3-acyl type have their progestational activity extended over a prolonged period of time. The prolonged activity of these compounds makes them useful for replacement therapy designed to substitute or supplement ordinary natural progestational hormone levels in the body. Any of the progestational substances of the above formula are of special value in the maintenance of pregnancy whenever low levels of progesterone are in evidence. These progestational agents, moreover, are effective in the treatment of various states of uterine dysfunction including dysmenorrhea, puberty hemorrhages, and production of cyclic uterine bleeding when indicated. These progestational agents can also antagonize the action of androgens such as testosterone, and methyltestosterone, prevent ovulation in animals and humans, and under special conditions, with or without an esterogen supplement, produce more efficient utilization of food for meat production in various farm animals.

EXAMPLE I

Delta-4-Pregnen-3-Beta-Ol-20-One-20-Ethylene Ketal

A. DELTA-5-PREGNEN-3-BETA-ACETOXY-20-ONE-20-ETHYLENE KETAL

A solution of 15 g. of delta-5-pregnenolone acetate in 530 cc. of dry benzene and 16 cc. of ethylene glycol was refluxed with 1.0 g. of p-toluenesulfonic acid employing a water separator. After 18 hours the separation of water was complete and the mixture was washed with saturated aqueous bicarbonate solution, then with water, dried over sodium sulfate and evaporated. There remained a semicrystalline residue weighing 14.6 g.

A small sample was chromatographed on aluminum oxide and gave after recrystallization colorless plates melting from 157 to 161° C.; $[\alpha]_D^{26}$ of minus 40° (chloroform).

Analysis.—Percent calculated for $C_{25}H_{38}O_4$: C, 74.59; H, 9.52. Found: C, 74.59; H, 9.47. Infrared analysis indicated the absence of a ketone.

B. DELTA-5-PREGNEN-3-BETA-OL-20-ONE-20-ETHYLENE KETAL 10 g. of crude 3-acetoxy delta-5-pregnen-3-beta-acetoxy-20-one-20-ethylene ketal were hydrolyzed with 500 cc. of 5% methanolic sodium hydroxide at 26° C. during 4 hours which gave 8.1 g. crude delta-5-pregnen-3-beta-ol-20-one-20-ethylene ketal. A sample was chromatographed on aluminum oxide and gave after recrystallization colorless prisms with the following constants: melting point, 163–166° C.; $[\alpha]_D^{26}$ of minus 39° (chloroform). Infrared analysis indicated the absence of a ketone and the presence of a hydroxyl.

*Analysis.*—Percent calculated for $C_{23}H_{36}O_3$: C, 76.62; H, 10.07. Found: C, 76.97; H, 9.57.

C. PROGESTERONE-20-ETHYLENE KETAL 7.0 g. of crude delta-5-pregnen-3-beta-ol-20-one-20-ethylene ketal were dissolved in 100 cc. acetone, a solution of 10 g. aluminum tert. butoxide in 225 cc. benzene added and refluxed for 10 hours. The reaction mixture was washed with water, ammonium chloride solution and water again, and finally the benzene layer was dried and evaporated. The crude residue was purified by chromatography on aluminum oxide and gave 5.9 g. of pure progesterone-20-ethylene ketal (colorless prisms), melting at 189 to 191° C.; $[\alpha]_D^{26}$ of plus 119° (chloroform).

*Analysis.*—Percent calculated for $C_{23}H_{34}O_3$: C, 77.05; H, 9.56. Found: C, 77.32; H, 9.71.

The structure of this product was further established by its infrared analysis, indicating the presence of an unsaturated ketone and the absence of a saturated ketone. An ultraviolet absorption spectrum showed a maximum at 242 m$\mu$ ($\epsilon$ 16,800).

D. DELTA-4-PREGNEN-3-BETA-OL-20-ONE-20-ETHYLENE KETAL 2.0 g. of progesterone-20-ethylene ketal were dissolved in 40 cc. methanol and 1.0 g. of sodium borohydride added in small portions with magnetic stirring. After allowing to stand overnight water was added, the methanol was evaporated off in vacuo, and the mixture was filtered and recrystallized from methanol resulting in 1.8 g. colorless prisms, melting from 157–175° C. The infrared analysis indicated the presence of hydroxyl and the absence of a ketone. The ultraviolet analysis showed no absorption from 225–270 m$\mu$. An 800 mg. sample of the above mixture was carried through a digitonin separation and gave 609 mg. of the beta-fraction, which, after chromatography on aluminum oxide, crystallized in prisms from methanol, melting from 170–173° C.; $[\alpha]_D^{26}$ of plus 71° (chloroform).

*Analysis.*—Percent calculated for $C_{23}H_{36}O_3$: C, 76.62; H, 10.07. Found: C, 76.65; H, 9.98.

EXAMPLE II

*Delta-4-Pregnen-3-Beta-Ol-20-One*

300 mg. crude delta-4-pregnen-3-beta-ol-20-one-20-ethylene ketal were dissolved in 20 cc. 0.08% ethanolic oxalic acid solution and allowed to stand for 16 hours at 25° C. Then the mixture was neutralized with conc. aqueous ammonia solution, the ethanol evaporated off in vacuo and the resulting crystallisate filtered off. After chromatography on aluminum oxide and recrystallization 230 mg. of colorless prisms, melting at 155–161° C. were obtained, $[\alpha]_D^{25}$ of plus 135° (chloroform).

*Analysis.*—Percent calculated for $C_{21}H_{32}O_2$: C, 79.70; H, 10.14. Found: C, 79.96; H, 9.98.

The structure of this product was further established by infrared analysis, indicating the presence of a hydroxyl and a ketone. The ultraviolet analysis showed no absorption from 225–250 m$\mu$.

As indicated above this hydrolysis reaction to remove the ketal is general. Following this method delta-4-pregnen-3,11-diol-20-one-20-ethylene ketal may be hydrolyzed to form delta-4-pregnen-3,11-diol-20-one; delta-4-pregnen-3,21-diol-20-one-20-ethylene ketal may be hydrolyzed to form delta-4-pregnen-3,21-diol-20-one; delta-4-pregnen-3,11,21-triol-20-one-20-propylene ketal may be hydrolyzed to form delta-4-pregnen-3,11,21-triol-20-one; delta-4-pregnen-3-beta-ol-11,20-dione-20-ethylene ketal may be hydrolyzed to form delta-4-pregnen-3-beta-ol-11,20-dione and delta-4-pregnen-3-beta,21-diol-11,20-dione-20-ethylene ketal may be hydrolyzed to form delta-4-pregnen-3-beta,21-diol-11,20-dione. The same hydrolysis is effective where the 3-hydroxy group is esterified with acyl groups as identified hereinabove. While it is preferred to esterify the ketal intermediate the free hydrolyzed 20-keto compound of this example may be directly esterified using an acid anhydride and pyridine as set forth in Example III.

EXAMPLE III

*Delta-4-Pregnen-3-Beta-Propionoxy-20-One-20-Ethylene Ketal*

100 mg. delta-4-pregnen-3-beta-ol-20-one-20-ethylene ketal were dissolved in 1.0 cc. pyridine, 0.25 cc. propionic anhydride was added and the mixture allowed to stand overnight at room temperature. Then it was poured on ice, allowed to stand for 3 hours and finally the mixture was extracted with benzene, the benzene layer washed with sodium bicarbonate solution in water, dried and evaporated. The crude residue weighing 100 mg. showed on infrared analysis no hydroxyl but an ester grouping.

Following this procedure but substituting as esterifying agents for the propionic anhydride of this example, caproic anhydride, phenyl acetic anhydride and benzoyl chloride, delta-4-pregnen-3-beta-caproyloxy-20-one-20-ethylene ketal, delta-4-pregnen-3-beta-phenyl acetoxy-20-one-20-ethylene ketal, and delta-4-pregnen-3-beta-benzoyloxy-20-one-20-ethylene ketal are respectively prepared, which may be hydrolyzed with ethanolic oxalic acid according to the procedure of Example II respectively to delta-4-pregnen-3-beta-caproyloxy-20-one, delta-4-pregnen-3-beta-phenyl acetoxy-20-one, and delta-4-pregnen-3-beta-benzoyloxy-20-one.

These compounds are usually used at a dosage level of 0.5 to 1.0 mg./kg. body weight introduced into the body in any manner preferably introduced subcutaneously; dissolved in a vegetable oil carrier such as peanut or corn oil.

This application is a continuation-in-part of our copending application Serial No. 551,723, filed December 8, 1955, now abandoned.

We claim:
1. A compound having the formula

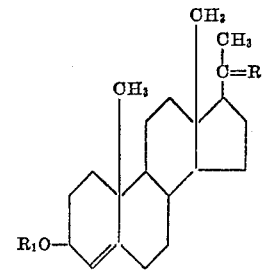

wherein R is a radical selected from the group consisting of oxygen and lower alkylene ketal, and $R_1$ is selected from the group consisting of hydrogen and hydrocarbon acyl having from 1 to 10 carbon atoms.

2. A compound having the formula

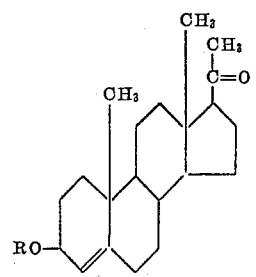

wherein R is a hydrocarbon acyl radical having 1 to 10 carbon atoms.

3. A compound having the formula

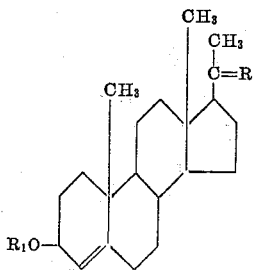

wherein R is ethylene ketal and $R_1$ is a hydrocarbon acyl radical having 1 to 10 carbon atoms.

4. Delta-4-pregnen-3-beta-ol-20-one.
5. Delta-4-pregnen-3-beta-ol-20-one-20-lower alkylene ketal.
6. Delta-4-pregnen-3-beta-ol-20-one-20-ethylene ketal.
7. Delta-4-pregnen-3-beta-propionoxy-20- one-20-ethylene ketal.
8. Delta-4-pregnen-3-beta-propionoxy-20-one.
9. In a method of forming a compound having the formula

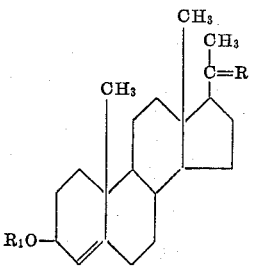

wherein R is a radical selected from the group consisting of oxygen and lower alkylene ketal, and $R_1$ is selected from the group consisting of hydrogen and hydrocarbon acyl having from 1 to 10 carbon atoms, the step of reducing progesterone-20-lower alkylene ketal with a hydride of an alkali metal and a member of the group consisting of aluminum and boron and then hydrolyzing the 20-ketal group with dilute ethanolic oxalic acid.

10. In a method of forming a compound having the formula

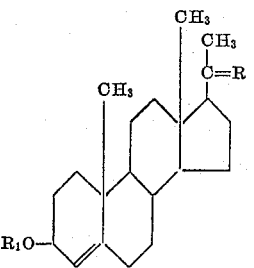

wherein R is a radical selected from the group consisting of oxygen and lower alkylene ketal, and $R_1$ is hydrocarbon acyl having from 1 to 10 carbon atoms, the steps of reducing progesterone-20-lower alkylene ketal with a hydride of an alkali metal and a member of the group consisting of aluminum and boron and then esterifying the 3-hydroxy group with a hydrocarbon acyl radical having from 1 to 10 carbon atoms and then hydrolyzing the 20-ketal group with dilute ethanolic oxalic acid.

11. The method of producing delta-4-pregnen-3-beta-ol-20-one comprising the steps of reducing progesterone-20-lower alkylene ketal with a hydride of an alkali metal and a metal of the group consisting of aluminum and boron, and then hydrolyzing the 20-lower alkylene ketal grouping with dilute ethanolic oxalic acid.

12. The method of forming a delta-4-pregnen-3-beta-(1–10 carbon atom hydrocarbon)acyloxy-20-one-20-lower alkylene ketal comprising reducing progesterone-20-lower alkylene ketal with a hydride of an alkali metal and a member of the group consisting of aluminum and boron, and then esterifying the 3-hydroxy group with a hydrocarbon acyl group having 1–10 carbon atoms, then hydrolyzing the ketal group with dilute ethanolic oxalic acid.

13. The method of forming a delta-4-pregnen-3-beta-(1–10 carbon atom hydrocarbon)acyloxy-20-one comprising the steps of reducing progesterone-20-lower alkylene ketal with a hydride of an alkali metal and a member of the group consisting of aluminum and boron, esterifying the 3-hydroxy group with a hydrocarbon acyl group having 1–10 carbon atoms and then hydrolyzing the 20-lower alkylene ketal group with dilute ethanolic oxalic acid.

14. The method of producing delta-4-pregnen-3-beta-propionoxy-20-one comprising reducing progesterone-20-lower alkylene ketal with a hydride of an alkali metal and a member of the group consisting of aluminum and boron, hydrolyzing the 20-lower alkylene ketal grouping with dilute ethanolic oxalic acid and then esterifying the 3-hydroxy group with a propionyl group.

15. The method of forming a delta-4-pregnen-3-beta-ol-20-one-lower alkylene ketal comprising converting a delta-5-pregnen-3-(1–10 carbon atom hydrocarbon)acyloxy-20-one to its 20-lower alkylene ketal, hydrolyzing the 3-acyl group, oxidizing the delta-5-pregnen-3-beta-ol-20-lower alkylene ketal to progesterone-20-lower alkylene ketal, and reducing the progesterone-20-lower alkylene ketal with a hydride of an alkali metal and a member of the group consisting of aluminum and boron to delta-4-pregnen-3-beta-ol-20-one-20-lower alkylene ketal.

16. The method of forming a delta-4-pregnen-3-beta-ol-20-one comprising converting a delta-5-pregnen-3-beta-(1–10 carbon atom hydrocarbon)acyloxy-20-one to its 20-lower alkylene ketal, hydrolyzing the 3-acyl group, oxidizing the delta-5-pregnen-3-beta-ol-20-one-20-lower alkylene ketal to progesterone-20-lower alkylene ketal, reducing the progesterone-20-lower alkylene ketal with a hydride of an alkali metal and a member of the group consisting of aluminum and boron to delta-4-pregnen-3-beta-ol-20-one-20-lower alkylene ketal and hydrolyzing the 20-lower alkylene ketal group with dilute ethanolic oxalic acid.

17. The method of forming a delta-4-pregnen-3-beta-(1–10 carbon atom hydrocarbon)acyloxy-20-one comprising converting a delta-5-pregnen-3-acyloxy-20-one to its 20-lower alkylene ketal, hydrolyzing the 3-acyl group, oxidizing the delta-5-pregnen-3-beta-ol-20-one-20-lower alkylene ketal to progesterone-20-lower alkylene ketal, reducing the progesterone-20-lower alkylene ketal with a hydride of an alkali metal and a member of the group consisting of aluminum and boron to delta-4-pregnen-3-beta-ol-20-one-20-lower alkylene ketal, esterifying the 3-hydroxy group with 1–10 carbon atom hydrocarbon acyl group to form delta-4-pregnen-3-beta-(1–10 carbon atom hydrocarbon)acyloxy-20-one-20-lower alkylene ketal and hydrolyzing the 20-lower alkylene ketal group with dilute ethanolic oxalic acid.

18. The method of selectively hydrolyzing the 20-lower alkylene ketal group of a delta-4-pregnen-20-lower alkylene ketal compound having a readily hydrolyzable substituent in the 3 position selected from the group consisting of hydroxy and acyloxy having 1 to 10 carbon atoms comprising treating said pregnen-20-lower alkylene ketal compound with dilute ethanolic oxalic acid.

19. The method of hydrolyzing the 20-ethylene ketal group to the 20-keto of a compound selected from the group consisting of delta-4-pregnen-3 beta,11-diol-20-one-20-ethylene ketal; delta-4-pregnen-3 beta,21-diol-20-one-20-ethylene ketal; delta-4-pregnen-3 beta,11,21-triol-20-one-20-ethylene ketal; delta-4-pregnen-3-beta-ol-11,20-dione-20-ethylene ketal and delta-4-pregnen-3-beta,21-diol-11,20-dione-20-ethylene ketal each respectively to the compound delta-4-pregnen-3 beta,11-diol-20-one; delta-4-pregnen-3 beta, 21-diol-20-one; delta-4-pregnen-3 beta, 11,21-triol-20-one; delta-4-pregnen-3-beta-ol-11,20-dione and delta-4-pregnen-3-beta,21-diol-11,20-dione comprising treating said ethylene ketal compound with dilute ethanolic oxalic acid.

20. A compound of the formula:

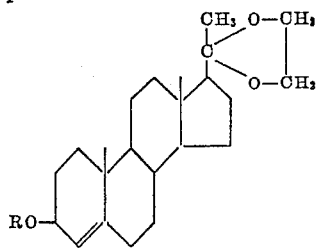

wherein R is selected from the group consisting of hydrogen and hydrocarbon acyl having from 1 to 10 carbon atoms.

References Cited in the file of this patent
UNITED STATES PATENTS

| | | |
|---|---|---|
| 2,702,291 | Sondheimer | Feb. 15, 1955 |
| 2,900,382 | Sondheimer et al. | Aug. 18, 1959 |
| 2,947,762 | Ringold et al. | Aug. 2, 1960 |

OTHER REFERENCES

Journal of American Chem. Soc., Romo et al., vol. 73, pages 4961–4964 relied on.